United States Patent
Aizono

(10) Patent No.: US 9,560,228 B2
(45) Date of Patent: Jan. 31, 2017

(54) DOCUMENT READING APPARATUS, CONTROL METHOD IN DOCUMENT READING APPARATUS, AND STORAGE MEDIUM

(71) Applicant: CANON KABUSHIKI KAISHA, Tokyo (JP)

(72) Inventor: Keisuke Aizono, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/739,982

(22) Filed: Jun. 15, 2015

(65) Prior Publication Data

US 2015/0373209 A1 Dec. 24, 2015

(30) Foreign Application Priority Data

Jun. 18, 2014 (JP) .................. 2014-125732

(51) Int. Cl.
*H04N 1/04* (2006.01)
*H04N 1/00* (2006.01)

(52) U.S. Cl.
CPC .................. *H04N 1/0057* (2013.01)

(58) Field of Classification Search
CPC .................................................. H04N 1/0057
USPC ................... 358/488, 486, 496, 498
See application file for complete search history.

(56) References Cited

U.S. PATENT DOCUMENTS

| | | | | |
|---|---|---|---|---|
| 7,673,875 B2 * | 3/2010 | Motohashi | ........... | G03G 15/703 271/258.01 |
| 2002/0051186 A1 * | 5/2002 | Takahashi | ........... | G06F 11/0733 358/1.15 |
| 2005/0012259 A1 * | 1/2005 | Sano | ....................... | B65H 7/125 271/10.01 |
| 2005/0269759 A1 * | 12/2005 | Sano | ....................... | B65H 7/125 271/3.01 |
| 2005/0275159 A1 * | 12/2005 | Yoshimura | ............. | B65H 7/125 271/265.04 |
| 2006/0164456 A1 * | 7/2006 | Yamagishi | ............. | B65H 7/125 347/16 |
| 2007/0138738 A1 * | 6/2007 | Motohashi | ........... | G03G 15/703 271/256 |

(Continued)

FOREIGN PATENT DOCUMENTS

| | | |
|---|---|---|
| JP | 2008-271537 A | 11/2008 |
| JP | 2012229065 A | 11/2012 |
| JP | 2013010599 A | 1/2013 |

*Primary Examiner* — Cheukfan Lee
(74) *Attorney, Agent, or Firm* — Canon U.S.A., Inc. IP Division

(57) ABSTRACT

A document reading apparatus includes a conveying unit to convey a document, a reading unit to read an image of the conveyed document, a detecting unit to detect multi-feed of the conveyed document, a setting unit, a stopping unit, and a displaying unit. The setting unit makes a setting indicating whether, based on detecting multi-feed of the document, conveyance of the document is to stop. The stopping unit stops conveyance of the document where the made setting indicates that, in response to detecting multi-feed of the document, the conveyance of the document is to stop. Where the made setting indicates that, in response to detecting multi-feed of the document, the conveyance of the document is to stop, the displaying unit displays a screen for receiving, from a user, an instruction not to stop conveyance of the document, even in a case where the detecting unit detects multi-feed of the document.

20 Claims, 10 Drawing Sheets

(56) References Cited

U.S. PATENT DOCUMENTS

2008/0018951 A1* 1/2008 Bannai ................. H04N 1/3872
                                                           358/451
2015/0246782 A1* 9/2015 Iwami ..................... B65H 7/20
                                                           271/9.05

* cited by examiner

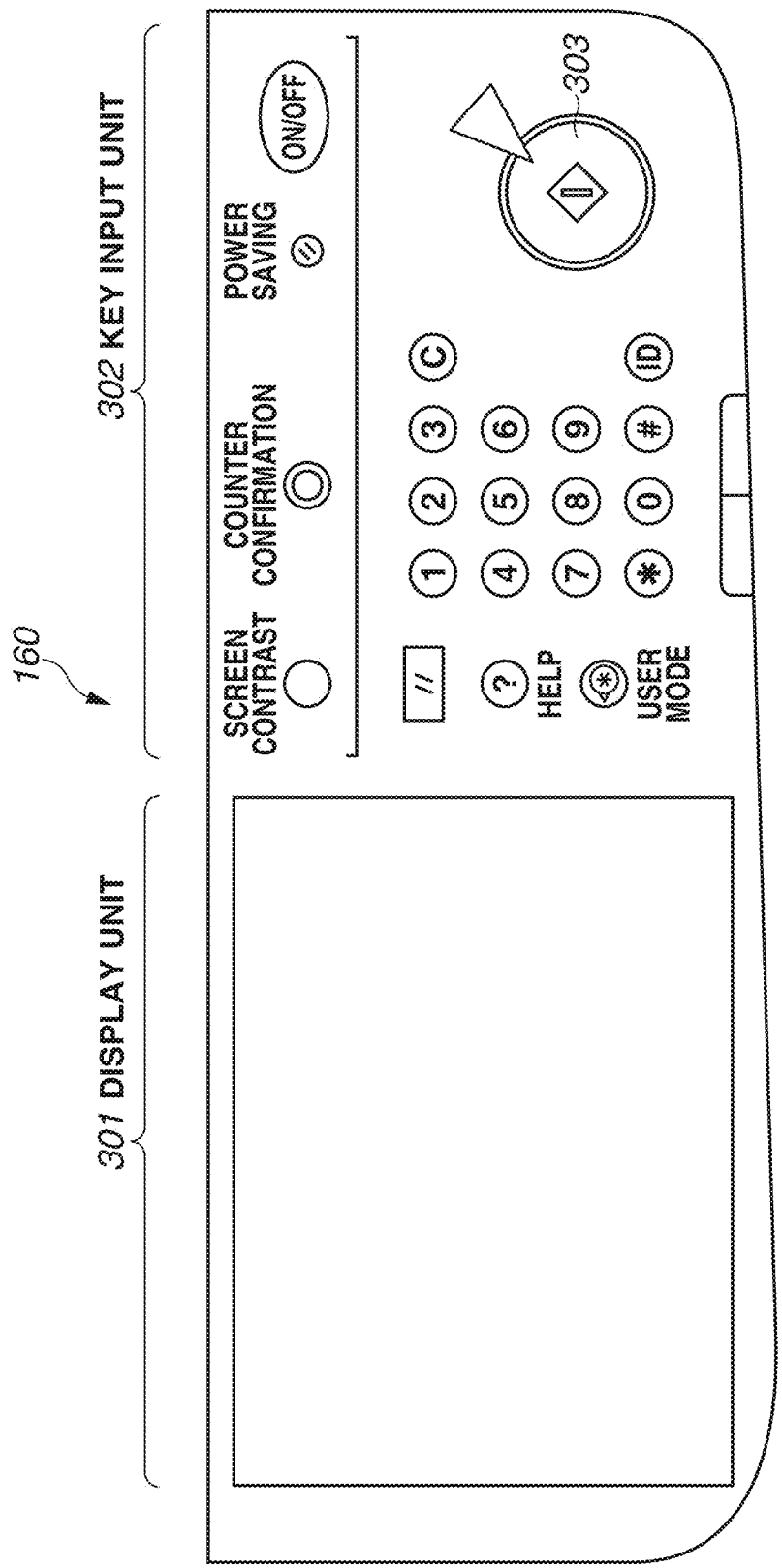

DOCUMENT READING APPARATUS, CONTROL METHOD IN DOCUMENT READING APPARATUS, AND STORAGE MEDIUM

BACKGROUND OF THE INVENTION

Field of the Invention

The present invention relates to a document reading apparatus for detecting multi-feed of a document, a control method in the document reading apparatus, and a storage medium.

Description of the Related Art

There is an image reading apparatus for conveying a document from an automatic document feeder (ADF) to read an image of the document and for detecting, using a multi-feed detection sensor such as an ultrasonic wave sensor, that multi-feed has occurred in the conveyed document.

The publication of Japanese Patent Application Laid-Open No. 2008-271537 discusses an image reading apparatus for, according to the fact that a multi-feed detection sensor has detected multi-feed of document, stopping conveyance of the document. The image reading apparatus displays a screen for allowing a user to select whether to resume reading of an image of the document or stop reading of an image of the document.

For example, to read an image of a document having two sheets on top of each other such as an envelope, the document is conveyed from an ADF. In this case, even if the document is properly conveyed, the multi-feed detection sensor detects multi-feed of the document sheets. After the conveyance of the document stops and if a succeeding document is conveyed to resume reading of an image of the document, the multi-feed detection sensor detects multi-feed of the document again.

In the image reading apparatus discussed in the publication of Japanese Patent Application Laid-Open No. 2008-271537, every time the multi-feed detection sensor has detected multi-feed of a document, the image reading apparatus waits for the user to give an instruction to resume conveyance of the document or reading of an image of the document, and then resumes conveyance of the document or reading of an image of the document. When an image of a document having two sheets on top of each other such as an envelope is read and even if the document is properly conveyed, multi-feed of the document is detected. Thus, the user needs to give an instruction to resume conveyance of a document or reading of an image of a document each time, which is cumbersome.

SUMMARY OF THE INVENTION

According to an aspect of the present invention, a document reading apparatus includes a conveying unit configured to convey a document, a reading unit configured to read an image of the document conveyed by the conveying unit, a detecting unit configured to detect multi-feed of the document conveyed by the conveying unit, a setting unit configured to make a setting indicating whether, based on the detecting unit detecting multi-feed of the document, conveyance of the document by the conveying unit is to stop, a stopping unit configured to stop conveyance of the document by the conveying unit in a case where the setting made by the setting unit indicates that, in response to the detecting unit detecting multi-feed of the document, the conveyance of the document by the conveying unit is to stop, and a displaying unit configured to display a screen, wherein, in a case where the setting made by the setting unit indicates that, in response to the detecting unit detecting multi-feed of the document, the conveyance of the document by the conveying unit is to stop, the displaying unit displays a screen for receiving, from a user, an instruction not to stop conveyance of the document by the conveying unit, even in a case where the detecting unit detects multi-feed of the document.

Further features of the present invention will become apparent from the following description of exemplary embodiments with reference to the attached drawings.

BRIEF DESCRIPTION OF THE DRAWINGS

FIG. 3 is a top view of an operation unit of the MFP according to the present exemplary embodiment.

DESCRIPTION OF THE EMBODIMENTS

With reference to the accompanying drawings, exemplary embodiments of the present invention will be described in detail below. The following exemplary embodiments do not limit the present invention according to the appended claims, and not all the combinations of the features described in the exemplary embodiments are essential for a method for solving the problems in the present invention.

Figure 1:
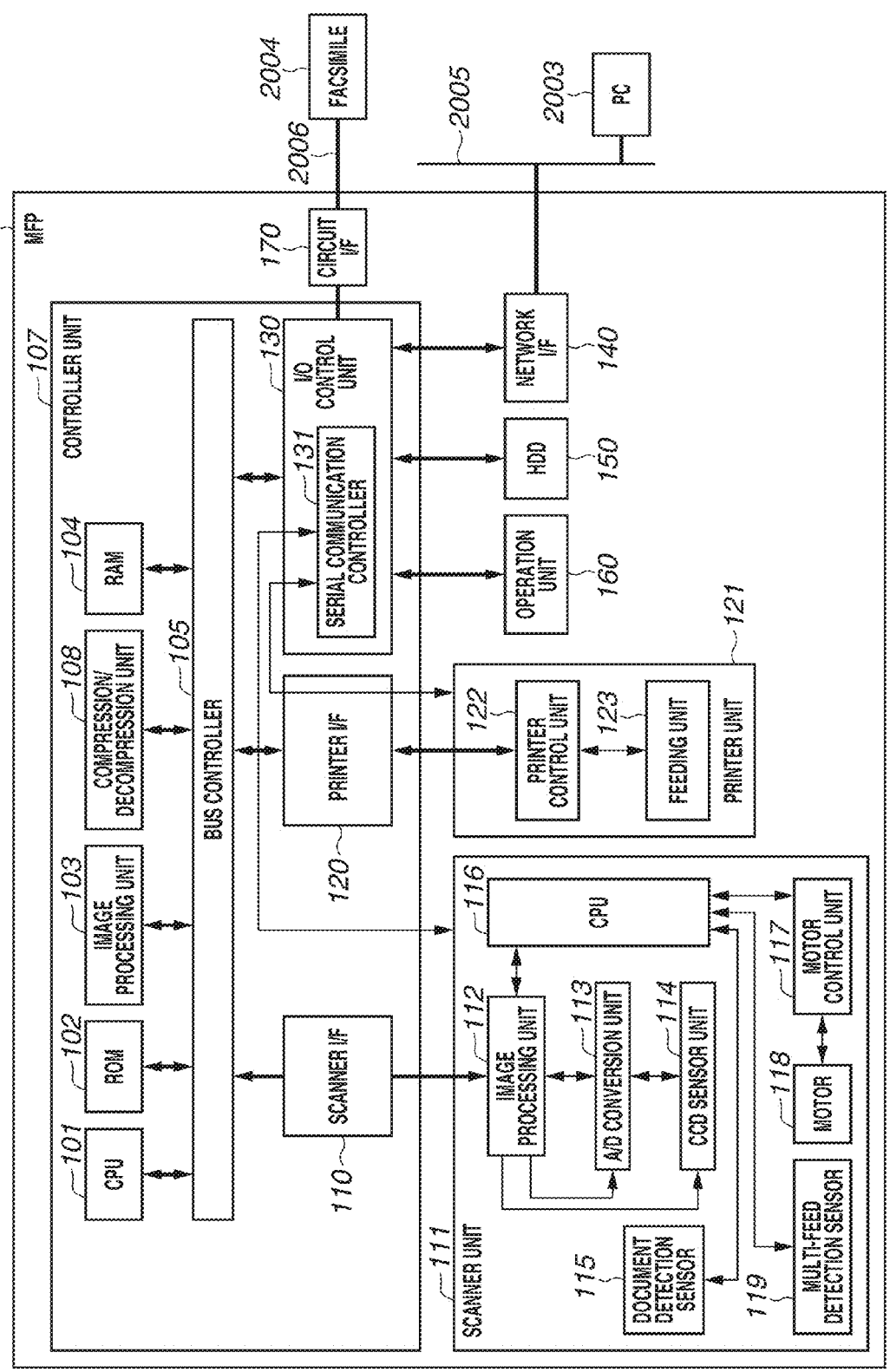
FIG. 1 is a block diagram illustrating a system according to the present exemplary embodiment.

With reference to FIG. 1, a system according to a first exemplary embodiment of the present invention is described.

In the first exemplary embodiment, a job for reading an image of a first document and an image of a second document conveyed after the first document is executed. During the execution of the job, according to the fact that a multi-feed detection sensor has detected multi-feed of the first document, scanning is suspended. Then, when the multi-feed detection sensor has detected multi-feed of the second document and if an instruction not to suspend the scanning has been received from a user, control is performed so that the scanning is not suspended due to the detection of the multi-feed of the second document.

The details are described below.

The system according to the present exemplary embodiment includes a multifunction peripheral (MFP) 2001, which is an example of an image reading apparatus (also referred to as a "document reading apparatus") for reading an image of a document, a personal computer (PC) (computer) 2003, which is an external apparatus, and a facsimile 2004.

The MFP 2001 has an image reading function for reading a document to generate image data, and a print function (a copy function) for printing an image on a sheet based on the generated image data. Further, the MFP 2001 has a print function (a PC print function) for receiving a print job from the external apparatus such as the PC 2003 and for printing text or an image on a sheet based on the received print job.

That is, the MFP 2001 functions as a printing apparatus in addition to the image reading apparatus. The present exemplary embodiment is described taking the MFP 2001 as an example of the image reading apparatus. Alternatively, the image reading apparatus may be a scanner for reading a document to generate image data and transmitting the generated image data to the PC 2003, so long as the scanner has an image reading function. Further, the image reading apparatus may be a scanner that does not transmit generated image data to the PC 2003, but saves the generated image data in an external memory attachable to and detachable from the scanner, such as a Universal Serial Bus (USB) memory.

The MFP 2001 is connected to the PC 2003 via a local area network (LAN) 2005 such as a local area network and communicates with the PC 2003.

Further, the MFP 2001 is connected to the facsimile 2004 via a public line 2006 and communicates with the facsimile 2004.

The PC 2003 submits a print job to the MFP 2001 via a network such as the LAN 2005. Then, the MFP 2001 processes the print job submitted from the PC 2003 via the network such as the LAN 2005.

In the present exemplary embodiment, an example is described where the MFP 2001 and the PC 2003 are connected together via the LAN 2005. Alternatively, the MFP 2001 and the PC 2003 may be connected together via a wide area network (WAN) such as the Internet. Further, the MFP 2001 and the PC 2003 may be connected together via a USB cable. Furthermore, the MFP 2001 and the PC 2003 may be configured to communicate with each other by wireless communication such as Wireless Fidelity (Wi-Fi) or Bluetooth®.

The PC 2003 generates image data using application software and transmits the generated image data to the MFP 2001. The present exemplary embodiment is described taking the PC 2003 as an example of the external apparatus. The prevent invention, however, is not limited to this. Alternatively, the external apparatus may be a mobile information terminal such as a personal digital assistant (PDA) or a smartphone, a network connection device, or an external dedicated apparatus.

The MFP 2001 includes a controller unit (control unit) 107, a scanner unit 111, a printer unit 121, a network interface (I/F) 140, a hard disk drive (HDD) 150, an operation unit 160, and a circuit I/F 170. These components are electrically connected, and transmit and receive a control command and data to and from each other.

The network I/F 140, which is an example of a communication unit, is an interface for transmitting and receiving a control command and image data to and from the PC 2003. On the other hand, the circuit I/F 170, which is an example of a communication unit, is an interface for connecting the controller unit 107 to the public line 2006.

The controller unit 107 includes as a plurality of functional blocks a central processing unit (CPU) 101, a read-only memory (ROM) 102, an image processing unit 103, a random-access memory (RAM) 104, a compression/decompression unit 108, a scanner I/F 110, a printer I/F 120, and an input/output (I/O) control unit 130. These components are electrically connected via a bus controller 105, and transmit and receive a control command and data to and from each other.

The CPU 101 controls processing and operations of the scanner unit 111, the printer unit 121, and various units (a feeding unit 123 and the like), which are included in the MFP 2001.

The ROM 102 is a read-only memory and stores programs for a boot sequence and font information in advance.

The RAM 104 is a readable and writable memory, and stores image data sent from the scanner unit 111 or the network I/F 140, various programs, and various pieces of setting information. The RAM 104 is, for example, a dynamic random-access memory (DRAM).

The ROM 102 or the HDD 150 stores various control programs to be executed by the CPU 101 and required to perform various processes of flowcharts described below. The ROM 102 or the HDD 150 also stores a display control program for displaying various user interface (UI) screens on a display unit of the operation unit 160. The CPU 101 reads a program stored in the ROM 102 or the HDD 150, and loads the read program into the RAM 104, thereby performing various operations according to the present exemplary embodiment.

The ROM 102 or the HDD 150 also stores a program for causing the CPU 101 to perform operations of interpreting page description language (PDL) data received from the PC 2003 via the network I/F 140, and converting the PDL data into raster image data (bitmap image data). These operations are processed by software.

The scanner I/F 110 is an interface for connecting to the scanner unit 111, which is an image reading device. On the other hand, the printer I/F 120 is an interface for connecting to the printer unit 121, which is an image output device. The controller unit 107 performs synchronous-to-asynchronous or asynchronous-to-synchronous conversion of image data, or controls image data via the scanner I/F 110 or the printer I/F 120.

The MFP 2001 includes as an example of a storage unit a non-volatile memory such as the HDD 150 for storing a job. The HDD 150 stores a plurality of pieces of data such as system software, print data of a job, image data converted into red, green, and blue (RGB) signals by an image processing unit 112 which will be described below, and image data compressed by the compression/decompression unit 108 which will also be described below. In the present exemplary embodiment, the HDD 150 has been described as an example of a large-capacity and non-volatile storage device. The present invention, however, is not limited to this. Alternatively, a non-volatile memory such as a solid-state drive (SSD) may be used so long as the non-volatile memory is a large-capacity and non-volatile storage device.

The controller unit 107 has a plurality of functions. For example, the controller unit 107 stores, in the HDD 150, image data of a document 203 read by the scanner unit 111. Then, the controller unit 107 reads the image data from the HDD 150. Alternatively, the controller unit 107 stores in the HDD 150 a print job received from the PC 2003 via the network I/F 140. Then, the controller unit 107 reads code data from the HDD 150 and converts the code data into image data.

Further, the controller unit 107 performs a print function for causing the printer unit 121 to print an image on a sheet 201 based on the thus obtained image data. Alternatively, the controller unit 107 performs a scanner transmission function for converting the image data of the document 203 read by the scanner unit 111 into code data and for transmitting the code data to the PC 2003 via the network I/F 140.

The scanner unit 111 includes the image processing unit 112, an analog-to-digital (A/D) conversion unit 113, a charge-coupled device (CCD) sensor unit 114, a document detection sensor 115, a CPU 116, a motor control unit 117, a motor 118, and a multi-feed detection sensor 119. Further, the scanner unit 111 is electrically connected via a serial communication controller 131 of the I/O control unit 130.

The document detection sensor 115 detects that the document 203 is placed on a document feeding tray 202. A detection signal from the document detection sensor 115 is transmitted to the CPU 101 via the scanner I/F 110 and the bus controller 105 of the controller unit 107.

The motor 118 is driven to rotate a document feeding roller 204, conveying rollers 206, a large roller 208, a roller 209, a roller 210, a roller 211, and a pair of document discharge rollers 207 of the scanner unit 111. The motor 118 is also driven to move an exposure unit 213 and a mirror unit 214 of the scanner unit 111.

A case is described where instructions to rotate the document feeding roller 204, the conveying rollers 206, the large roller 208, the roller 209, and the pair of document discharge rollers 207 are given to the motor 118 by the CPU 101 via the motor control unit 117. The present invention, however, is not limited to this. Alternatively, instructions to rotate the document feeding roller 204, the conveying rollers 206, the large roller 208, the roller 209, and the pair of document discharge rollers 207 may be given to the motor 118 directly by the CPU 116 of the scanner unit 111.

Similarly, a case is described where instructions to move the exposure unit 213 and the mirror unit 214 are given to the motor 118 by the CPU 101 via the motor control unit 117. The present invention, however, is not limited to this. Alternatively, instructions to move the exposure unit 213 and the mirror unit 214 may be given to the motor 118 directly by the CPU 116 of the scanner unit 111.

The multi-feed detection sensor 119 detects that multi-feed has occurred in the conveyed document 203. A detection signal from the multi-feed detection sensor 119 is transmitted to the CPU 101 via the scanner I/F 110 and the bus controller 105 of the controller unit 107. The details of the multi-feed detection sensor 119 will be described below with reference to FIG. 2.

Image data of the document 203 read by the CCD sensor unit 114 is converted from an analog signal to a digital signal by the A/D conversion unit 113. Then, the digital signal is converted into an RGB signal by the image processing unit 112. The RGB signal is temporarily stored in the RAM 104 via the scanner I/F 110 and the bus controller 105 of the controller unit 107. Then, under the control of the CPU 101 of the controller unit 107, the image data is saved in the HDD 150 via the I/O control unit 130.

When the image data saved in the HDD 150 is printed, the image data saved in the HDD 150 is temporarily saved in the RAM 104 under the control of the CPU 101 of the controller unit 107. Then, the temporarily saved image data is subjected to color space conversion such as a red, green, and blue to cyan, magenta, yellow, and black (RGB-to-CMYK) conversion by the image processing unit 103. Then, the resulting image data is transferred to the printer unit 121 via the printer I/F 120. The printer unit 121 includes a printer control unit 122, which controls communication with the controller unit 107. The printer unit 121 also includes the feeding unit (sheet holding unit) 123, which includes a plurality of cassettes and a manual feeding tray for holding the sheet 201 for use in printing. Further, the printer unit 121 is electrically connected via the serial communication controller 131 of the I/O control unit 130.

The printer unit 121 performs a process of printing a job to be printed that is stored in the HDD 150. An instruction to print image data is given to the printer unit 121 by the controller unit 107 via the printer control unit 122. The printer unit 121 transfers and fixes a toner image formed based on the image data onto the sheet 201 fed from the feeding unit 123, thereby forming (printing) an image on the sheet 201 using toner. The details of the transfer and the fixing will be described below with reference to FIG. 2.

The compression/decompression unit 108 includes an image processing block for performing a process of compressing and decompressing image data stored in the RAM 104 or the HDD 150, using various compression methods such as Joint Bi-level Image Experts Group (JBIG) and Joint Photographic Experts Group (JPEG), and for storing the image data in the RAM 104 again. The image data compressed by the compression/decompression unit 108 is transmitted to the PC 2003 via the network I/F 140.

The controller unit 107 receives image data from the PC 2003 via the network I/F 140. When storing image data received via the network I/F 140 in the HDD 150, the controller unit 107 causes the compression/decompression unit 108 to compress the received image data. On the other hand, when printing an image on the sheet 201 based on the image data stored in the HDD 150, the controller unit 107 causes the compression/decompression unit 108 to decompress the stored image data.

The operation unit 160 corresponds to an example of a user interface unit. As illustrated in a top view of the operation unit 160 (FIG. 3), the operation unit 160 includes a display unit 301 and a key input unit 302. Further, the operation unit 160 has a function of receiving various settings from a user through the display unit 301 or the key input unit 302. The operation unit 160 also has a function of providing information to the user through the display unit 301.

The display unit 301 includes a liquid crystal display (LCD: a liquid crystal display unit) and a touch panel sheet having a transparent electrode attached to the LCD (or using a capacitance method). On the LCD, an operation screen is displayed, and also the state of the MFP 2001 is displayed.

The key input unit 302 includes hardware keys. The hardware keys include, for example, a start key 303 for giving an instruction to execute a job.

Figure 2:
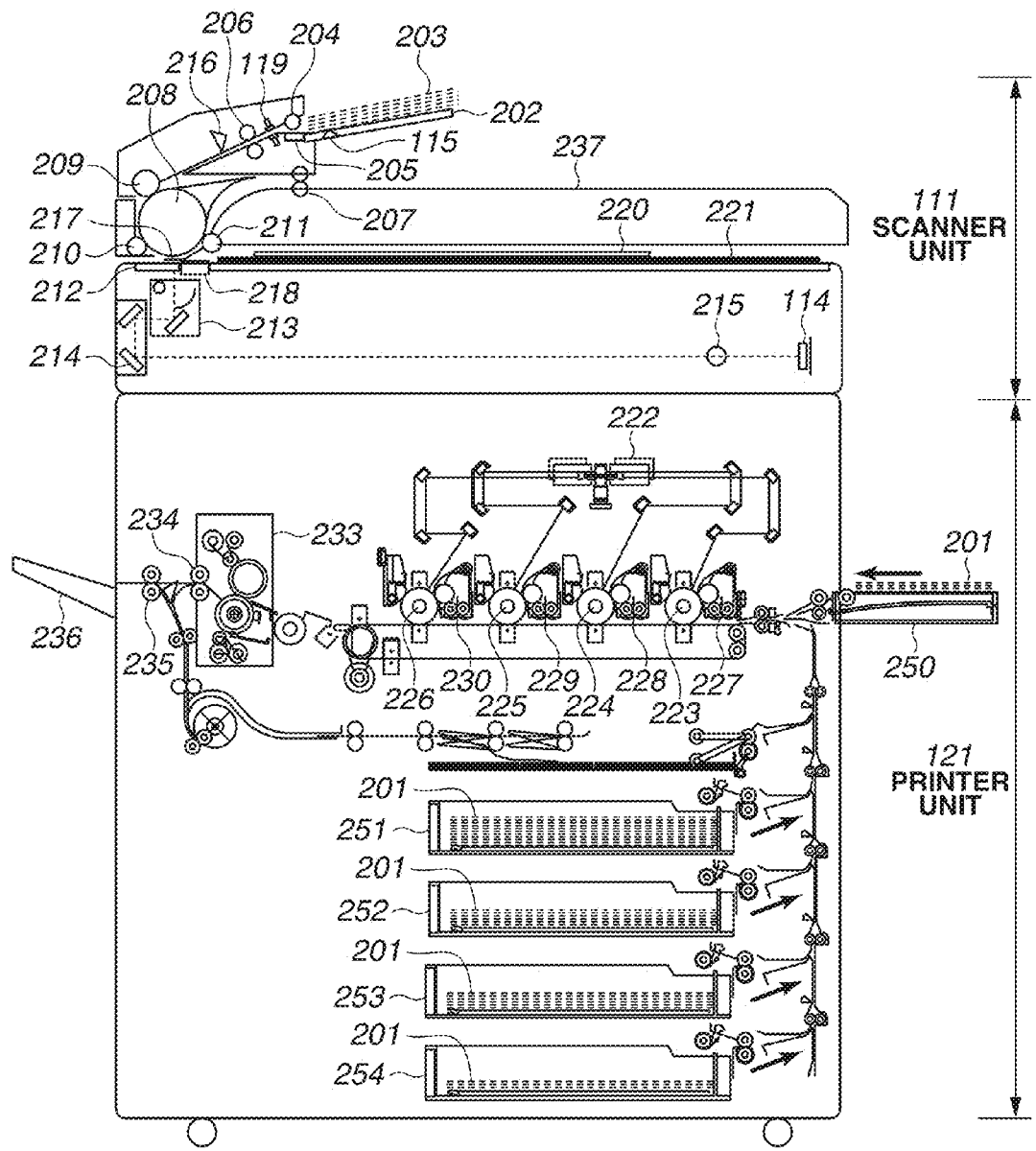
FIG. 2 is a cross-sectional view illustrating a configuration of a multifunction peripheral (MFP) according to the present exemplary embodiment.

FIG. 2 illustrates a cross-sectional view of the scanner unit 111 and the printer unit 121, which are illustrated in FIG. 1. A case is described below where an ADF performs an operation of reading an image of the document 203 (hereinafter referred to as "scanning"). If the document detection sensor 115 has detected that the documents 203 are placed on the document feeding tray 202, then according to the fact that an instruction to perform scanning has been received from the user, the scanning starts.

The documents 203 placed on the document feeding tray 202 are conveyed one by one by a pair of the document feeding roller 204 and a separating pad 205. Then, the documents 203 conveyed one by one pass through the multi-feed detection sensor 119.

The multi-feed detection sensor 119 detects that multi-feed has occurred in the conveyed documents 203. The multi-feed refers to a state where the documents 203 are conveyed with at least parts of two or more of the documents 203 on top of each other.

For example, in the multi-feed detection sensor 119 using ultrasonic waves, an upper sensor transmits ultrasonic waves, and a lower sensor detects changes in the ultrasonic waves, thereby detecting multi-feed. Then, if the reception strength of an actually detected signal is lower than a reference value obtained using the reception strength when a single document 203 is conveyed, the multi-feed detection sensor 119 determines that multi-feed has occurred. The present exemplary embodiment is described taking a sensor using ultrasonic waves as an example of the multi-feed detection sensor 119. Alternatively, an optical sensor may be used so long as the optical sensor can detect multi-feed. Further, the multi-feed detection sensor 119 may measure the thickness of the document 203, and, using the measurement data as a reference, determine whether multi-feed has occurred in the conveyed documents 203.

Each of the documents 203 having passed through the multi-feed detection sensor 119 is sent into the device by the conveying rollers 206. The document 203 conveyed by the conveying rollers 206 is detected by a document passage detection sensor 216. Then, based on the detection time, it is determined whether the passage of the first document 203 has completed.

The document 203 sent into the device by the conveying rollers 206 is conveyed by the large roller 208 and the roller 209, and further conveyed by the large roller 208 and the roller 210. Then, the document 203 is conveyed between a document glass 212 and a document guide plate 217 while being in contact with the document glass 212, and passes through a jump plate 218. Then, the document 203 is further conveyed by the large roller 208 and the roller 211, and discharged to a document discharge tray 237 by the pair of document discharge rollers 207.

The document feeding roller 204, the conveying rollers 206, the large roller 208, the roller 209, the roller 210, the roller 211, and the pair of document discharge rollers 207 are driven to rotate by the motor 118.

When the document 203 passes over the document glass 212, the surface of the document 203 in contact with the document glass 212 is exposed by the exposure unit 213, and an image of the document 203 is read in a main scanning direction and a sub-scanning direction. A resulting reflected light from the document 203 is transmitted to the mirror unit 214 via a plurality of mirrors. Then, the transmitted reflected light passes through a lens 215, is collected, and is converted into an electric signal by the CCD sensor unit 114. Image data output from the CCD sensor unit 114 is subjected to the above predetermined processing, and then, resulting image data is transferred to the controller unit 107.

In the present exemplary embodiment, a case has been described where an optical system included in the scanner unit 111 is a reduction optical system for forming an image of the reflected light from the document 203 on a CCD sensor. The present invention, however, is not limited to this. Alternatively, the optical system included in the scanner unit 111 may be an equal-magnification optical system for forming an image of the reflected light from the document 203 on a contact image sensor (CIS).

A case has been described where, when the scanner unit 111 performs the operation of reading an image of the document 203, the scanner unit 111 fixes the position of the optical system and reads an image of the document 203 while conveying the document 203 using the ADF (referred to as "ADF reading"). The present invention, however, is not limited to this. Alternatively, a document 220 may be placed on platen glass 221 (a document platen), and the scanner unit 111 may fix the position of the document 220 and read an image of the document 220 by the motor 118 driving the optical system to move (referred to as "pressure plate reading").

Now, a description is given below of an operation of outputting an image onto the sheet 201 based on image data transferred to the printer unit 121.

Image data transferred to the printer unit 121 is converted into laser light according to the image data by a laser unit 222. Then, photosensitive drums 223 to 226 are irradiated with the laser light, thereby forming electrostatic latent images according to the laser light on the photosensitive drums 223 to 226. To portions of the latent images on the photosensitive drums 223 to 226, toner is attached by developing units 227 to 230. A color printer includes four photosensitive drums and four developing units for cyan, yellow, magenta, and black.

Further, the printer unit 121 includes the feeding unit 123. The feeding unit 123 includes, as a sheet holding unit, cassettes 251 to 254 and a manual feeding tray 250. The cassettes 251 to 254 have drawable shapes and can hold a plurality of sheets 201. On the other hand, the manual feeding tray 250 has an insertable shape and can hold a plurality of sheets 201. The printer unit 121 may include two or more of the cassettes 251 to 254 and the manual feeding tray 250, and only needs to include at least one of the cassettes 251 to 254 and the manual feeding tray 250. The following description will be given on the assumption that the MFP 2001 according to the present exemplary embodiment includes, for example, four cassettes 251 to 254 and a single manual feeding tray 250.

The printer unit 121 feeds the sheet 201 from any one of the cassettes 251 to 254 and the manual feeding tray 250. Then, the printer unit 121 transfers toner attached to the photosensitive drums 223 to 226 onto the fed sheet 201 and then conveys the resulting sheet 201 to a fixing device 233. Then, the printer unit 121 fixes the toner onto the sheet 201 by heat and pressure. The sheet 201 having passed through the fixing device 233 is discharged to a discharge tray 236 by conveying rollers 234 and 235.

A case has been described where the MFP 2001 according to the present exemplary embodiment is a color printer including four photosensitive drums and four developing units. The present invention, however, is not limited to this. Alternatively, the present invention can also be similarly applied to the MFP 2001 that is a monochrome printer including a single photosensitive drum and a single developing unit. Further, a case has been described where the MFP 2001 according to the present exemplary embodiment uses a method for printing an image on the sheet 201 by an electrophotographic method. The present invention, however, is not limited to this. Alternatively, the MFP 2001 may use, for example, an ink-jet method or another method (e.g., a thermal transfer method) so long as the method can print an image on the sheet 201.

Figure 4A:
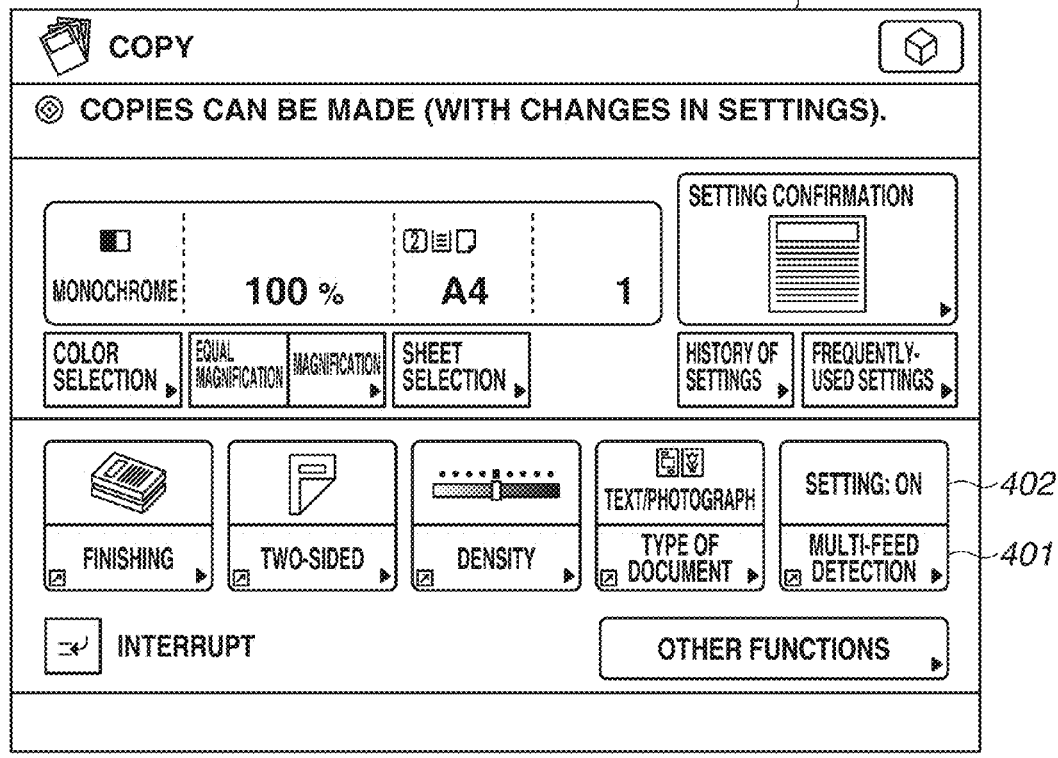
FIGS. 4A and 4B are diagrams illustrating a screen according to a first exemplary embodiment.

FIG. 4A illustrates an execution screen 400 for using the copy function in the MFP 2001 according to the present exemplary embodiment. The execution screen 400 is displayed on the display unit 301 according to the fact that the user has pressed a button for calling the copy function on a main screen (not illustrated) displayed on the display unit 301.

The user can optionally set, on the execution screen 400, various pieces of setting information (e.g., a magnification, sheet selection, and the type of document) with regard to the execution of a copy job. The various pieces of setting information set by the user are stored in the HDD 150.

Figure 5:
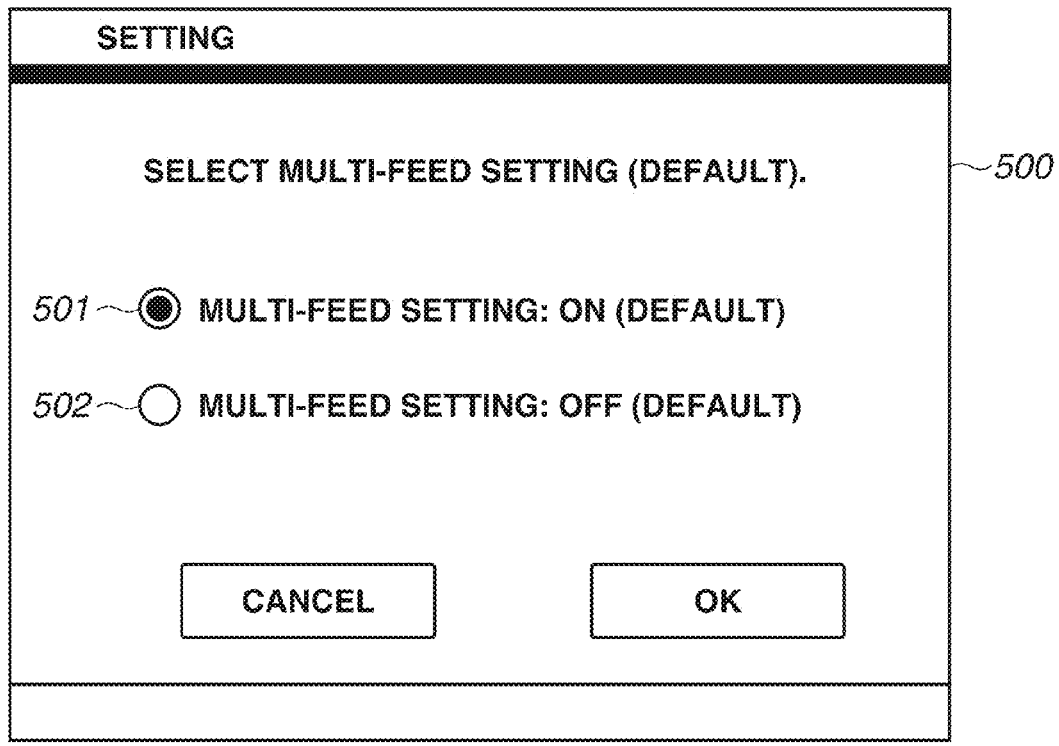
FIG. 5 is a diagram illustrating a screen according to the first exemplary embodiment.

Further, the user can make a setting regarding multi-feed detection (hereinafter referred to as a "multi-feed setting") on the execution screen 400. The setting information regarding multi-feed detection set by the user is stored in the HDD 150. According to the fact that the user has pressed a multi-feed setting button 401 on the execution screen 400, a setting screen 500 illustrated in FIG. 5 is displayed on the display unit 301.

Then, the user can select either "multi-feed setting: on" or "multi-feed setting: off" as a default multi-feed setting on the setting screen 500. If the multi-feed setting (default) has been set to on (501), then according to the fact that the multi-feed detection sensor 119 has detected multi-feed of a document 203, the scanning is suspended. If, on the other hand, the multi-feed setting (default) has been set to off (502) and even if the multi-feed detection sensor 119 has detected multi-feed of a document 203, the scanning is continued.

Figure 4B:
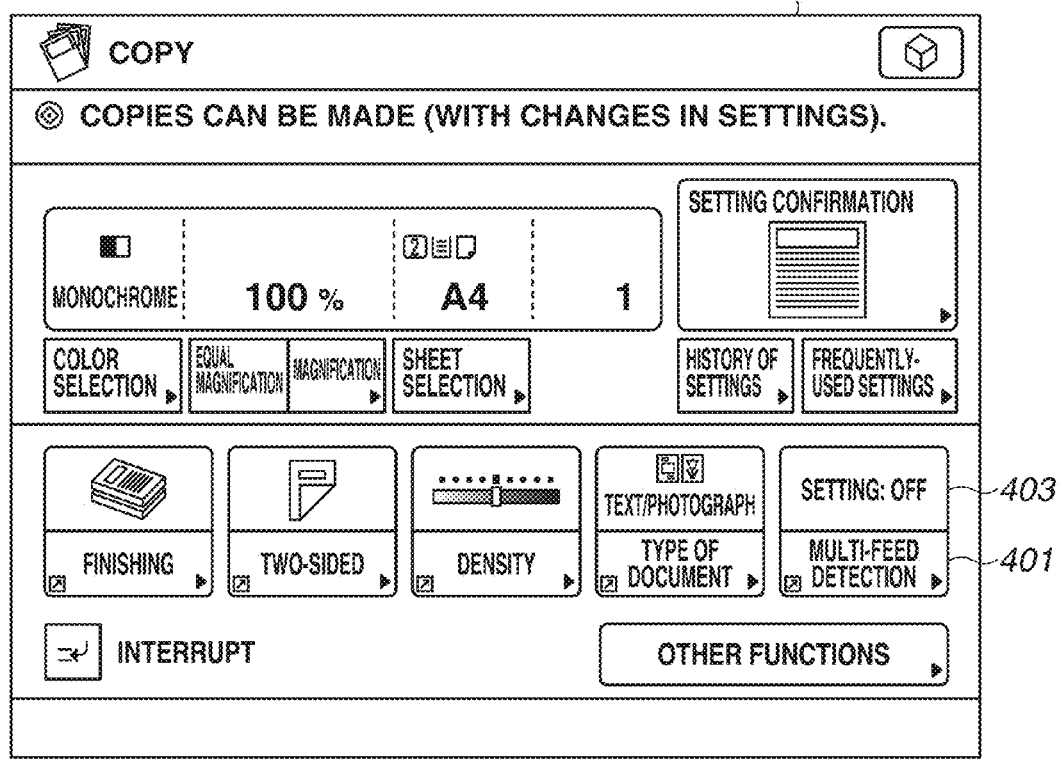

If the multi-feed setting (default) is set to on (501), "setting: on" (402) is displayed on the execution screen 400 as illustrated in FIG. 4A. If, on the other hand, the multi-feed setting (default) is set to off (502), "setting: off" (403) is displayed on the execution screen 400 as illustrated in FIG. 4B.

In the first exemplary embodiment, a job for reading an image of a first document and an image of a second document conveyed after the first document is executed. During the execution of the job, according to the fact that the multi-feed detection sensor 119 has detected multi-feed of the first document, the scanning is suspended. Then, when the multi-feed detection sensor 119 has detected multi-feed of the second document and if an instruction not to suspend the scanning has been received from the user, control is performed so that the scanning is not suspended due to the detection of the multi-feed of the second document.

The details are described below.

Figure 6:
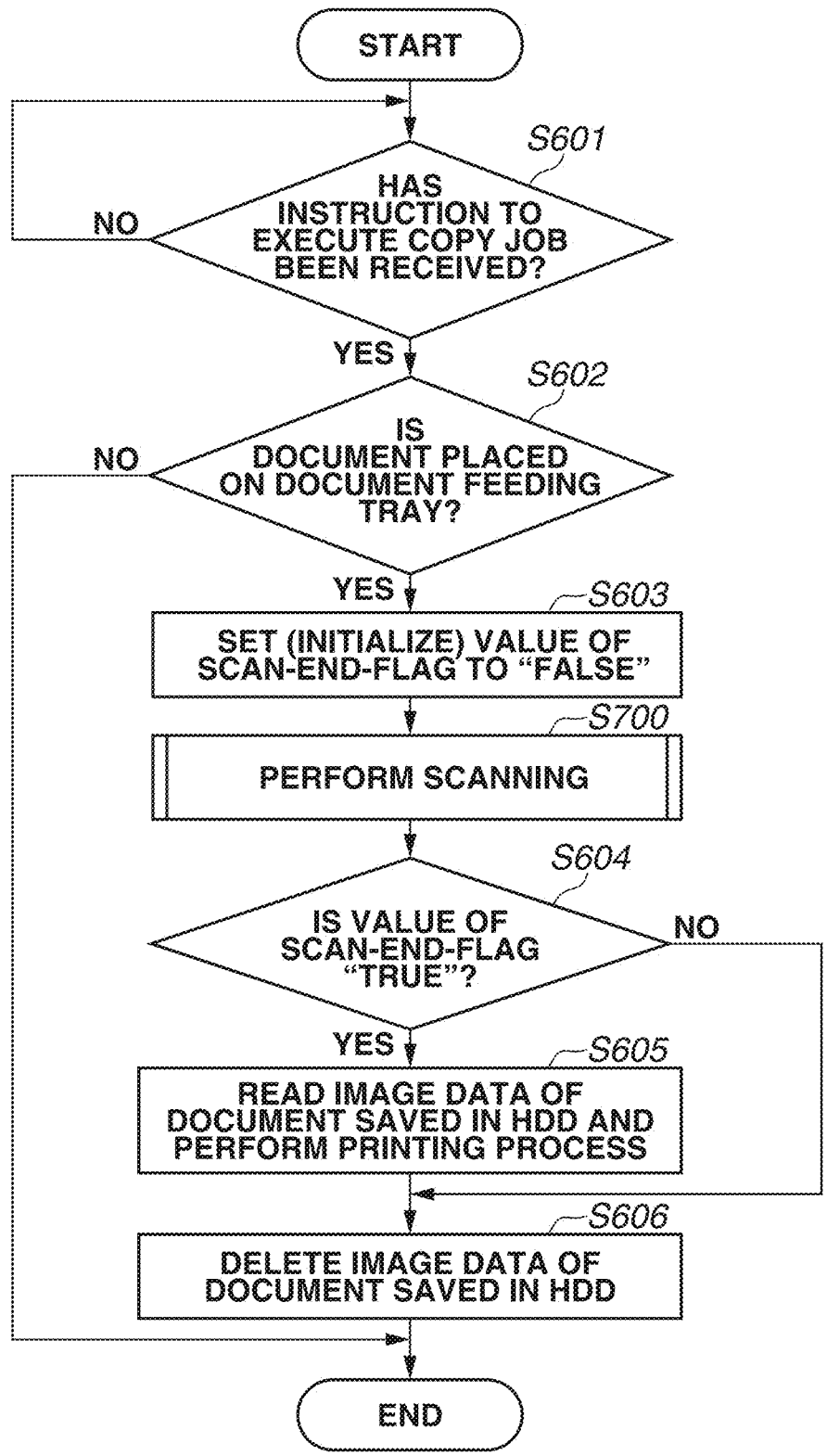
FIG. 6 is a flowchart illustrating an example of control according to the first exemplary embodiment.

With reference to a flowchart illustrated in FIG. 6, a description is given of the details of a series of processes for, in the MFP 2001 according to the first exemplary embodiment, receiving an instruction to execute a copy job and executing the received copy job. These processes are performed by the CPU 101 of the controller unit 107 executing a control program read from the ROM 102 or the HDD 150 and loaded into the RAM 104. The series of processes in FIG. 6 starts in a state where the execution screen 400 illustrated in FIG. 4A is displayed on the display unit 301 and the multi-feed setting (default) is set to on.

In step S601, the CPU 101 determines whether an instruction to execute a copy job has been received. If the CPU 101 determines that an instruction to execute a copy job has been received (YES in step S601), the processing proceeds to step S602. If, on the other hand, the CPU 101 determines that an instruction to execute a copy job has not been received (NO in step S601), the CPU 101 repeats the process of step S601 until the CPU 101 determines that an instruction to execute a copy job has been received. An instruction to execute a copy job is received according to the fact that the user has pressed the start key 303 in a state where the execution screen 400 illustrated in FIG. 4A is displayed on the display unit 301.

In step S602, the CPU 101 determines whether the document 203 is placed on the document feeding tray 202. The CPU 101 receives a detection signal from the document detection sensor 115 and thereby can determine that the document 203 is placed on the document feeding tray 202.

If the CPU 101 determines that the document 203 is placed on the document feeding tray 202 (YES in step S602), the processing proceeds to step S603. If, on the other hand, the CPU 101 determines that the document 203 is not placed on the document feeding tray 202 (NO in step S602), the series of processes in FIG. 6 ends.

In step S603, the CPU 101 sets (initializes) a value of a flag (hereinafter referred to as a "scan-end-flag") for indicating whether a series of processes regarding the reading (scanning) of an image of the document 203 has normally ended to "false". The value of the scan-end-flag is stored in the HDD 150.

If the value of the scan-end-flag is "true", it is indicated that the scanning has normally ended. If, on the other hand, the value of the scan-end-flag is "false", it is indicated that the scanning has not normally ended. For example, if an instruction to stop the scanning has been received, or if the execution of the copy job has been canceled, the CPU 101 determines that the scanning has not normally ended, and overwrites the value of the scan-end-flag with "false".

After the process of step S603, the processing proceeds to step S700. In step S700, the CPU 101 performs the series of processes regarding the scanning.

Figure 7:
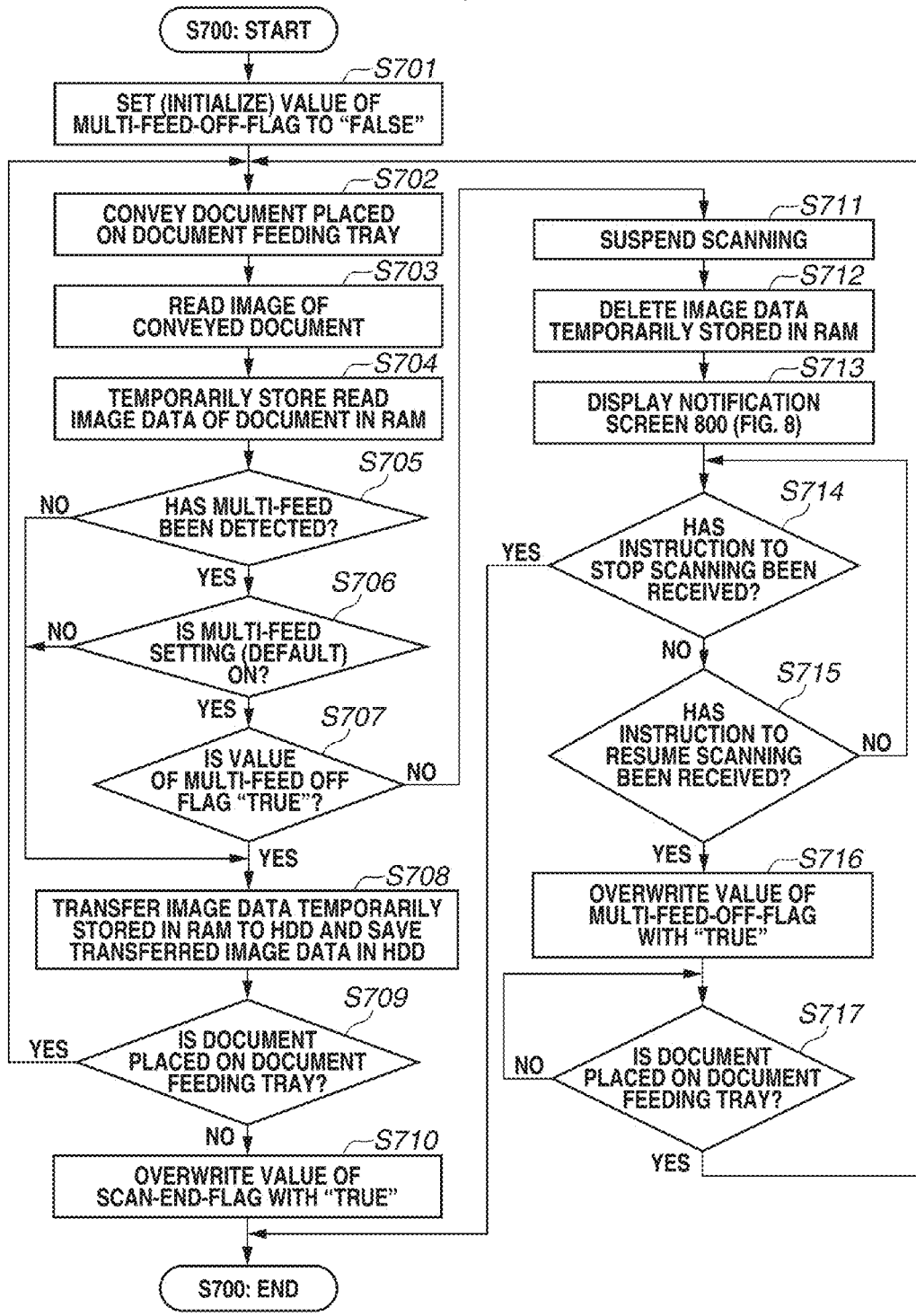
FIG. 7 is a flowchart illustrating the example of the control according to the first exemplary embodiment.

A description is given of the details of the series of processes regarding the scanning (step S700) in the MFP 2001 according to the first exemplary embodiment with reference to a flow chart illustrated in FIG. 7. These processes are performed by the CPU 101 of the controller unit 107 executing a control program read from the ROM 102 or the HDD 150 and loaded into the RAM 104.

In step S701, the CPU 101 sets (initializes) a value of a multi-feed-off-flag to "false", and the processing proceeds to step S702. The multi-feed-off-flag refers to a flag for indicating whether, if the multi-feed detection sensor 119 has detected multi-feed of the document 203, the scanning is to be continued until the scanning ends. The value of the multi-feed-off-flag is stored in the HDD 150.

If the value of the multi-feed-off-flag is "true" and even if the multi-feed detection sensor 119 has detected multi-feed of the document 203, the scanning is continued until the scanning ends. If, on the other hand, the value of the multi-feed-off-flag is "false", then, according to the fact that the multi-feed detection sensor 119 has detected multi-feed of the document 203, the scanning is suspended.

In step S702, the CPU 101 instructs a control unit (the CPU 116) of the scanner unit 111 to perform the following process. First, the CPU 116 drives the motor 118 via the motor control unit 117 to rotate the document feeding roller 204, the conveying rollers 206, the large roller 208, the roller 209, the roller 210, the roller 211, and the pair of document discharge rollers 207. Then, the CPU 116 causes these rollers to convey the document 203 placed on the document feeding tray 202.

After the process of step S702, the processing proceeds to step S703. In step S703, the CPU 101 instructs the control unit (the CPU 116) of the scanner unit 111 to perform the following process. When the document 203 conveyed in step S702 passes over the document glass 212, the CPU 116 causes the exposure unit 213 to expose the surface of the document 203 in contact with the document glass 212, thereby reading an image of the document 203 in the main scanning direction and the sub-scanning direction. The CPU 116 causes the resultant reflected light from the document 203 to be transmitted to the mirror unit 214 via a plurality of mirrors. Then, the CPU 116 causes the transmitted reflected light to be collected and causes the CCD sensor unit 114 to convert the reflected light into an electric signal.

After the process of step S703, the processing proceeds to step S704. In step S704, the CPU 101 instructs the control unit (the CPU 116) of the scanner unit 111 to perform the following process. The CPU 116 causes the A/D conversion unit 113 to convert an analog signal with regard to image data output from the CCD sensor unit 114 to a digital signal. The CPU 116 causes the image processing unit 112 to convert the digital signal into an RGB signal. Then, the CPU 116 transfers the RGB signal (the image data of the document 203) to the controller unit 107 via the scanner I/F 110 and the bus controller 105 of the controller unit 107. And, the CPU 101 temporarily stores in the RAM 104 the image data of the document 203 transferred to the controller unit 107.

After the process of step S704, the processing proceeds to step S705. In step S705, the CPU 101 determines whether the multi-feed detection sensor 119 has detected multi-feed of the document 203 conveyed in step S702. If the CPU 101 determines that the multi-feed detection sensor 119 has detected multi-feed (YES in step S705), the processing proceeds to step S706. If, on the other hand, the CPU 101 determines that the multi-feed detection sensor 119 has not detected multi-feed (NO in step S705), the processing proceeds to step S708.

In step S706, with reference to the setting information stored in the HDD 150, the CPU 101 determines whether the multi-feed setting (default) is on. If the CPU 101 determines that the multi-feed setting (default) is on (YES in step S706), the processing proceeds to step S707. If, on the other hand, the CPU 101 determines that the multi-feed setting (default) is not on (NO in step S706), the processing proceeds to step S708.

In step S707, with reference to the value of the multi-feed-off-flag stored in the HDD 150, the CPU 101 determines whether the value of the multi-feed-off-flag is "true". If the CPU 101 determines that the value of the multi-feed-off-flag is "true" (YES in step S707), the processing proceeds to step S708.

In step S708, the CPU 101 reads the image data temporarily stored in the RAM 104 in step S704, transfers the image data to the HDD 150 via the I/O control unit 130, and saves the image data in the HDD 150.

After the process of step S708, the processing proceeds to step S709. In step S709, based on the presence or absence of detection by the document detection sensor 115, the CPU 101 determines whether the document 203 is placed on the document feeding tray 202. If the CPU 101 determines that the document 203 is placed on the document feeding tray 202 (YES in step S709), the processing returns to step S702. If, on the other hand, the CPU 101 determines that the document 203 is not placed on the document feeding tray 202 (NO in step S709), the processing proceeds to step S710.

In step S710, the CPU 101 overwrites the value of the scan-end-flag stored in the HDD 150 with "true". After the process of step S710, the series of processes in FIG. 7 (step S700) ends, and the processing proceeds to step S604 in FIG. 6.

On the other hand, with reference to the value of the multi-feed-off-flag stored in the HDD 150, if the CPU 101 determines that the value of the multi-feed-off-flag is not "true" (NO in step S707), the processing proceeds to step S711.

In step S711, the CPU 101 instructs the control unit (the CPU 116) of the scanner unit 111 to suspend the scanning. The CPU 116 may suspend the scanning before the document 203 of which the multi-feed has been detected is discharged to the document discharge tray 237. Alternatively, the CPU 116 may suspend the scanning after the document 203 of which the multi-feed has been detected is discharged to the document discharge tray 237. With the suspension of the scanning, the CPU 116 stops the conveyance of the document 203 and the reading of an image of the document 203, and the processing proceeds to step S712.

In step S712, the CPU 101 deletes the image data temporarily stored in the RAM 104 in step S704, and the processing proceeds to step S713.

Figure 8:
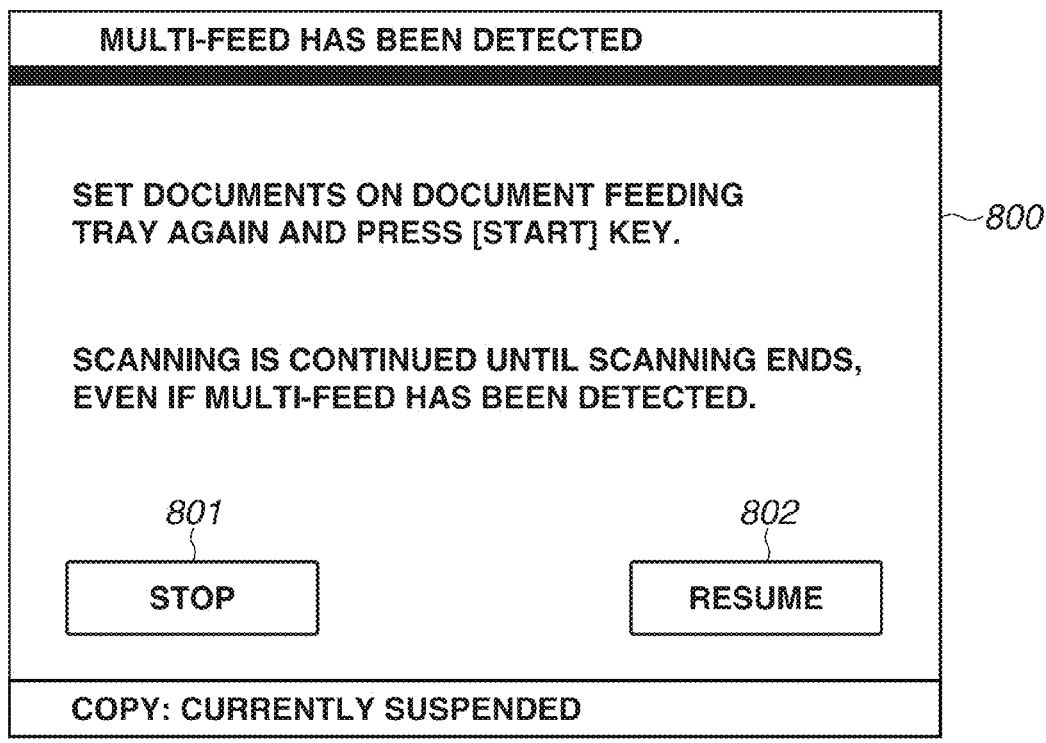
FIG. 8 is a diagram illustrating a screen according to the first exemplary embodiment.

In step S713, the CPU 101 displays on the display unit 301 a notification screen 800 illustrated in FIG. 8, and the processing proceeds to step S714. The notification screen 800 illustrated in FIG. 8 is a screen for urging the user to place the document 203 of which the multi-feed has been detected and another sheet of the document 203 left on the document feeding tray 202, together on the document feeding tray 202 again. Further, the notification screen 800 is a screen for notifying the user that the scanning is continued until the scanning ends, even if the multi-feed detection sensor 119 has detected multi-feed.

In step S714, the CPU 101 determines whether an instruction to stop the scanning has been received. In first exemplary embodiment, for example, according to the fact that the user has pressed a stop button 801 on the notification screen 800, the CPU 101 determines that an instruction to stop the scanning has been received. If the CPU 101 determines that an instruction to stop the scanning has been received (YES in step S714), the series of processes in FIG. 7 (step S700) ends, and the processing proceeds to step S604 in FIG. 6. If, on the other hand, the CPU 101 has determined that an instruction to stop the scanning has not been received (NO in step S714), the processing proceeds to step S715.

In step S715, the CPU 101 determines whether an instruction to resume the scanning has been received. In the first exemplary embodiment, for example, according to the fact that the user has pressed the start key 303 of the operation unit 160, the CPU 101 determines that an instruction to resume the scanning has been received. Alternatively, for example, according to the fact that the user has pressed a resumption button 802 on the notification screen 800, the CPU 101 determines that an instruction to resume the scanning has been received.

If the CPU 101 determines that an instruction to resume the scanning has been received (YES in step S715), the processing proceeds to step S716. If, on the other hand, the CPU 101 determines that an instruction to resume the scanning has not been received (NO in step S715), the processing returns to step S714.

In step S716, the CPU 101 overwrites the value of the multi-feed-off-flag stored in the HDD 150 with "true", and the processing proceeds to step S717.

In step S717, based on the presence or absence of detection by the document detection sensor 115, the CPU 101 determines whether the document 203 is placed on the document feeding tray 202. If the CPU 101 determines that the document 203 is placed on the document feeding tray 202 (YES in step S717), the processing returns to step S702. If, on the other hand, the CPU 101 determines that the document 203 is not placed on the document feeding tray 202 (NO in step S717), the CPU 101 repeats the process of step S717 until the CPU 101 determines that the document 203 is placed on the document feeding tray 202.

The above description is the details of the series of processes regarding the scanning (step S700) in the MFP 2001 according to the first exemplary embodiment.

In step S604 in FIG. 6, with reference to the value of the scan-end-flag stored in the HDD 150, the CPU 101 determines whether the value of the scan-end-flag is "true". If the CPU 101 determines that the value of the scan-end-flag is "true" (YES in step S604), the processing proceeds to step S605. If, on the other hand, the CPU 101 determines that the value of the scan-end-flag is not "true" (NO in step S604), the processing proceeds to step S606.

In step S605, the CPU 101 reads the image data of the document 203 saved in the HDD 150 in step S708, transfers the image data to the RAM 104 via the I/O control unit 130, and temporarily stores the image data in the RAM 104. Then, the CPU 101 instructs the printer unit 121 to perform a printing process based on the image data of the document 203 temporarily stored in the RAM 104.

After the process of step S605, the processing proceeds to step S606. In step S606, the CPU 101 deletes the image data of the document 203 saved in the HDD 150 in step S708, and the series of processes in FIG. 6 ends.

This is the details of the series of processes for, in the MFP 2001 according to the first exemplary embodiment, receiving an instruction to execute a copy job and executing the received copy job.

As described above, in the first exemplary embodiment, a job for reading an image of a first document and an image of a second document conveyed after the first document is executed. During the execution of the job, according to the fact that the multi-feed detection sensor 119 has detected multi-feed of the first document, the scanning is suspended. Then, when the multi-feed detection sensor 119 has detected multi-feed of the second document and if an instruction not to suspend the scanning has been received from the user, control is performed so that the scanning is not suspended due to the detection of the multi-feed of the second document. Thus, it is possible to prevent a process that is performed due to the detection of the multi-feed of the second document but is not intended by the user (e.g., the stopping of the conveyance of the document 203, the stopping of the reading of an image of the document 203, or the display of a confirmation screen that needs to receive an instruction from the user).

If a document 203 is an envelope or a sheet with a sticky note and even if the document 203 is properly conveyed, the multi-feed detection sensor 119 detects multi-feed. This is because an envelope or a sheet with a sticky note has two sheets on top of each other. Thus, in the first exemplary embodiment to which the present invention is applied, for example, when the documents 203 that are envelopes or sheets with sticky notes are scanned and even if multi-feed has been frequently detected, the scanning can be continued without waiting for an instruction to resume the scanning every time multi-feed has been detected, which is more effective.

If the multi-feed detection sensor 119 has detected multi-feed multiple times, such documents 203 are regarded as documents 203 of which multi-feed is frequently detected. As described above, for example, envelopes are the documents 203 of which multi-feed is frequently detected.

In response, for example, the number of times the multi-feed detection sensor 119 has detected multi-feed of documents 203 is counted up. A counter for counting up the number of times multi-feed has been detected is stored in the HDD 150. The number of times multi-feed of the documents 203 has been detected may be obtained from the external apparatus such as the PC 2003. Then, until the multi-feed detection sensor 119 detects multi-feed of the documents 203 N times (multiple times), the scanning is suspended according to the fact that the multi-feed detection sensor 119 has detected multi-feed of the document 203. On the other hand, control may be performed so that according to the fact that the multi-feed detection sensor 119 has detected multi-feed of the documents 203 N times (multiple times) or more, the scanning is continued without suspension from this point forward even if multi-feed has been detected again. The value of N may be a predetermined value specific to the MFP 2001, or may be a value that can be optionally set by the user on a setting screen (not illustrated).

In the first exemplary embodiment, the following case has been described. During the execution of a job for scanning a first document and a second document conveyed after the first document, according to the fact that the multi-feed detection sensor 119 has detected multi-feed of the first document, the scanning is suspended. Then, when the multi-feed detection sensor 119 has detected multi-feed of the second document and if an instruction not to suspend the scanning has been received from the user, control is performed so that the scanning is not suspended due to the detection of the multi-feed of the second document.

On the other hand, in a second exemplary embodiment, the following case is described. During the execution of the job, according to that the fact that the multi-feed detection sensor 119 has detected multi-feed of the first document, the scanning is suspended. Then, the user is allowed to optionally select the method for resuming the scanning. The method for resuming the scanning that can be selected by the user is any one of "suspend the scanning every time multi-feed has been detected", "continue the scanning until the scanning ends, even if multi-feed has been detected", and "continue the scanning of only the current document (a single sheet) even if multi-feed has been detected".

An MFP 2001 according to the second exemplary embodiment is different from that of the first exemplary embodiment (FIG. 7) in part of the series of processes regarding the scanning (step S700).

Figure 9:
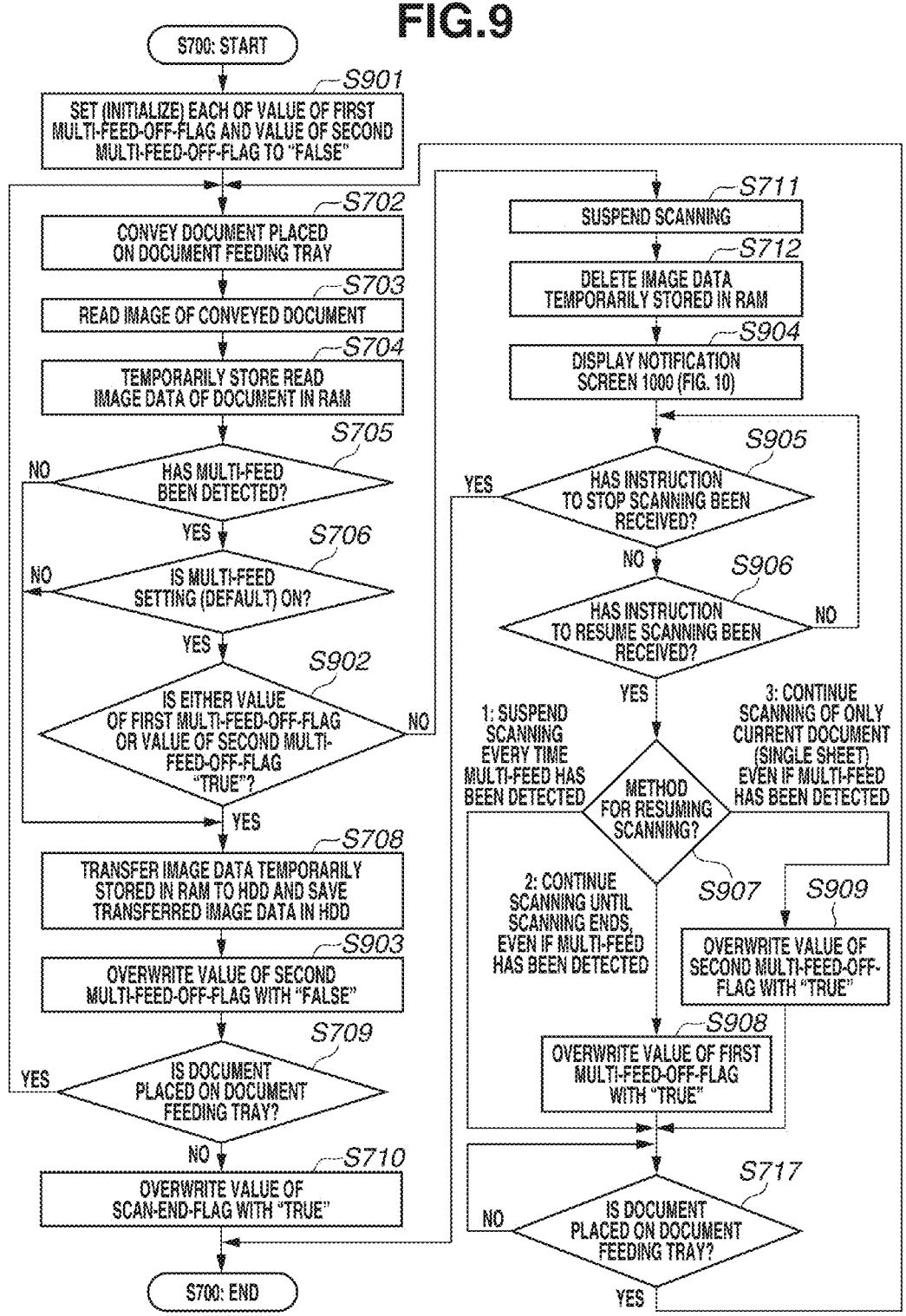
FIG. 9 is a flowchart illustrating an example of control according to a second exemplary embodiment.

Thus, with reference to FIG. 9, processes different from those of the first exemplary embodiment are mainly described. Processes similar to those of the first exemplary embodiment are designated by the same step numbers and are not described in detail here.

As illustrated in FIG. 9, at the start of the process of step S700, first, in step S901, the CPU 101 sets (initializes) each of the value of a first multi-feed-off-flag and the value of a second multi-feed-off-flag to "false", and the processing proceeds to step S702. Each of the value of the first multi-feed-off-flag and the value of the second multi-feed-off-flag is stored in the HDD 150.

The first multi-feed-off-flag refers to a flag for indicating whether, if the multi-feed detection sensor 119 has detected multi-feed of the document 203, the scanning is to be continued until the scanning ends. Further, the second multi-feed-off-flag refers to a flag for indicating whether, even if the multi-feed detection sensor 119 has detected multi-feed of the document 203, the scanning of only the current document (a single sheet) is to be continued.

If the value of the first multi-feed-off-flag is "true", it is indicated that if the multi-feed detection sensor 119 has detected multi-feed of the document 203, the scanning is to be continued until the scanning ends. If, on the other hand, the value of the first multi-feed-off-flag is "false", it is indicated that according to the fact that the multi-feed detection sensor 119 has detected multi-feed of the document 203, the scanning is to be suspended.

If, on the other hand, the value of the second multi-feed-off-flag is "true", it is indicated that even if the multi-feed detection sensor 119 has detected multi-feed of the document 203, the scanning of only the current document (a single sheet) is to be continued. If, on the other hand, the value of the second multi-feed-off-flag is "false", it is indicated that according to the fact that the multi-feed detection sensor 119 has detected multi-feed of the document 203, the scanning of the current document is to be suspended.

Further, as illustrated in FIG. 9, in step S706, if the CPU 101 determines that the multi-feed setting (default) is on (YES in step S706), the processing proceeds to step S902.

In step S902, the CPU 101 references each of the value of the first multi-feed-off-flag and the value of the second multi-feed-off-flag stored in the HDD 150. Then, the CPU 101 determines whether either the value of the first multi-feed-off-flag or the value of the second multi-feed-off-flag is "true". If the CPU 101 determines that either value is "true" (YES in step S902), the processing proceeds to step S708. After the process of step S708, the processing proceeds to step S903. In step S903, the CPU 101 overwrites the value of the second multi-feed-off-flag stored in the HDD 150 with "false", and the processing proceeds to step S709. If, on the other hand, the CPU 101 determines that neither value is "true" (NO in step S902), the processing proceeds to step S711.

Further, as illustrated in FIG. 9, after the process of step S712, the processing proceeds to step S904.

Figure 10:
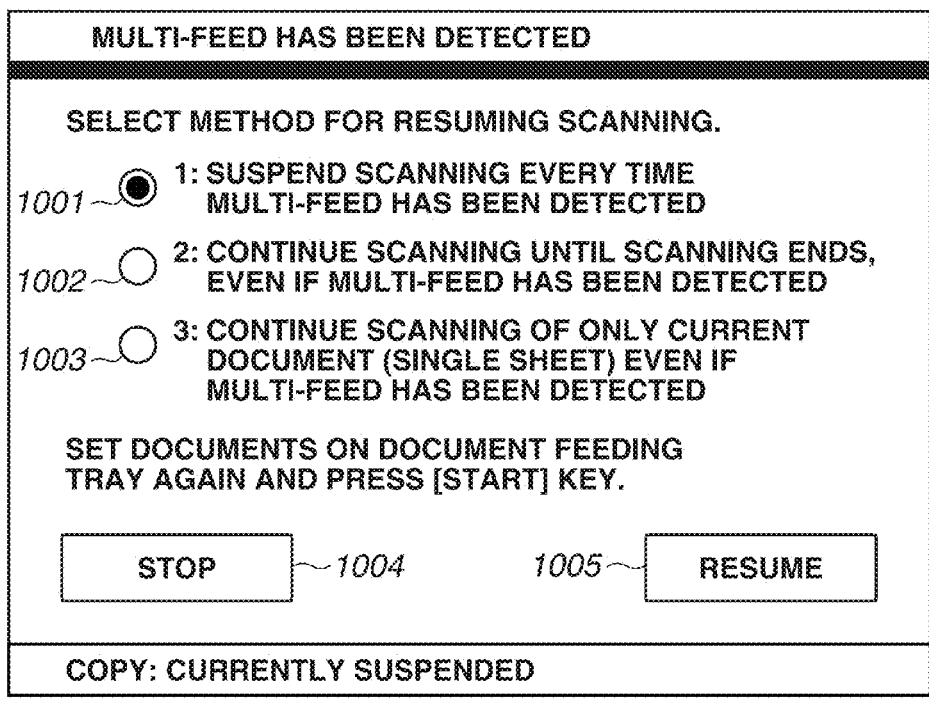
FIG. 10 is a diagram illustrating a screen according to the second exemplary embodiment.

In step S904, the CPU 101 displays on the operation unit 160 a notification screen 1000 illustrated in FIG. 10, and the processing proceeds to step S905.

The notification screen 1000 in FIG. 10 is a screen for urging the user to place the document 203 of which the multi-feed has been detected and another sheet of the document 203 left on the document feeding tray 202, together on the document feeding tray 202 again.

The notification screen 1000 is also a screen for urging the user to optionally select a method for resuming the scanning. The method for resuming the scanning is any one of "suspend the scanning every time multi-feed has been detected" (1001), "continue the scanning until the scanning ends, even if multi-feed has been detected" (1002), and "continue the scanning of only the current document (a single sheet) even if multi-feed has been detected" (1003).

In step S905, the CPU 101 determines whether an instruction to stop the scanning has been received. The process of step S905 corresponds to step S714 in FIG. 7 described above in the first exemplary embodiment. In the second exemplary embodiment, for example, according to the fact that the user has pressed a stop button 1004 on the notification screen 1000 in FIG. 10, the CPU 101 determines that an instruction to stop the scanning has been received.

If the CPU 101 determines that an instruction to stop the scanning has been received (YES in step S905), the series of processes in FIG. 9 ends, and the processing proceeds to step S604 in FIG. 6. If, on the other hand, the CPU 101 determines that an instruction to stop the scanning has not been received (NO in step S905), the processing proceeds to step S906.

In step S906, the CPU 101 determines whether an instruction to resume the scanning has been received. The process of step S906 corresponds to step S715 in FIG. 7 described above in the first exemplary embodiment. In the second exemplary embodiment, according to the fact that the user has pressed a resumption button 1005 on the notification screen 1000 in FIG. 10 or the start key 303 on the operation unit 160 in FIG. 3, the CPU 101 determines that an instruction to resume the scanning has been received.

If the CPU 101 determines that an instruction to resume the scanning has been received (YES in step S906), the processing proceeds to step S907. If, on the other hand, the CPU 101 has determined that an instruction to resume the scanning has not been received (NO in step S906), the processing returns to step S905.

In step S907, the CPU 101 determines which one of the above three methods is the method for resuming the scanning. As described above, the method for resuming the scanning is optionally selected by the user on the notification screen 1000 in FIG. 10.

If, as a result of the determination of step S907, the CPU 101 determines that the method for resuming the scanning is "suspend the scanning every time multi-feed has been detected" (1001), the processing proceeds to step S717. If, as a result of the determination of step S907, the CPU 101 determines that the method for resuming the scanning is "continue the scanning until the scanning ends, even if multi-feed has been detected" (1002), the processing proceeds to step S908. If, as a result of the determination of step S907, the CPU 101 determines that the method for resuming the scanning is "continue the scanning of only the current document (a single sheet) even if multi-feed has been detected" (1003), the processing proceeds to step S909.

In step S908, the CPU 101 overwrites the value of the first multi-feed-off-flag stored in the HDD 150 with "true", and the processing proceeds to step S717.

In step S909, the CPU 101 overwrites the value of the second multi-feed-off-flag stored in the HDD 150 with "true", and the processing proceeds to step S717.

This is the details of, among the series of processes regarding the scanning in the MFP 2001 according to the second exemplary embodiment, the processes different from those of the first exemplary embodiment (FIG. 7).

As described above, in the second exemplary embodiment, during the execution of a job for scanning a first document and a second document conveyed after the first document, according to the fact that the multi-feed detection sensor 119 has detected multi-feed of the first document, the scanning is suspended. Then, the user can optionally select the method for resuming the scanning. As described above, in the second exemplary embodiment to which the present invention is applied, the user can take into account a type and characteristics of the document 203 to be scanned. Then, when multi-feed has been detected, for example, the user can optionally determine whether the scanning is to be continued without waiting for an instruction to resume the scanning. This improves the convenience of the user.

The present invention is not limited to the above exemplary embodiments. Various modifications (including the organic combinations of the exemplary embodiments) can be made based on the spirit of the present invention, but are not excluded from the scope of the present invention.

For example, in the present exemplary embodiments, the case has been described where an image of the document 203 placed on the document feeding tray 202 is read on the document glass 212. The present invention, however, is not limited to this. Alternatively, the present invention can also be similarly applied to a case where an image of the document 203 placed on the document platen is read on the platen glass 221.

Further, in the present exemplary embodiments, the case has been described where an instruction to execute a copy job is received, and the received copy job is executed. The present invention, however, is not limited to this. The execution of the job only needs to include the operations of conveying the document 203 and reading an image of the conveyed document 203. For example, the present invention can also be similarly applied to a job for reading an image of the document 203 to generate image data and transmitting the generated image data to the PC 2003.

Furthermore, the present exemplary embodiments have been described on the assumption that if the multi-feed setting (default) has been set to off and even if the multi-feed detection sensor 119 has detected multi-feed of the document 203, the scanning is continued. The present invention, however, is not limited to this. If the multi-feed setting (default) has been set to off, a switch is turned off so that a signal from the multi-feed detection sensor 119 is not received. Thus, multi-feed per se of the document 203 is not detected. The present invention can also be similarly applied to such a case.

The present exemplary embodiments have been described taking the PC 2003 as an example of the external apparatus. Alternatively, the external apparatus may be a mobile information terminal such as a PDA or a smartphone, a network connection device, or an external dedicated apparatus.

Further, in the present exemplary embodiments, the CPU 101 of the controller unit 107 of the MFP 2001 performs the above various types of control. Alternatively, a print control apparatus such as an external controller having a housing separate from the MFP 2001 may be configured to perform some or all of the above various types of control.

While various examples and exemplary embodiments of the present invention have been described, the spirit and scope of the present invention are not limited to a particular description in the specification for a person skilled in the art.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-125732, filed Jun. 18, 2014, which is hereby incorporated by reference herein in its entirety.

What is claimed is:

1. A document reading apparatus comprising:
a conveying unit configured to convey a document;
a reading unit configured to read an image of the document conveyed by the conveying unit;
a detecting unit configured to detect multi-feed of the document conveyed by the conveying unit;
a setting unit configured to make a setting indicating whether, based on the detecting unit detecting multi-feed of the document, conveyance of the document by the conveying unit is to stop;
a stopping unit configured to stop conveyance of the document by the conveying unit in a case where the setting made by the setting unit indicates that, in response to the detecting unit detecting multi-feed of the document, the conveyance of the document by the conveying unit is to stop; and
a displaying unit configured to display a screen,
wherein, in a case where the setting made by the setting unit indicates that, in response to the detecting unit detecting multi-feed of the document, the conveyance of the document by the conveying unit is to stop, the displaying unit displays a screen for receiving, from a user, an instruction not to stop conveyance of the document by the conveying unit, even in a case where the detecting unit detects multi-feed of the document.

2. The document reading apparatus according to claim 1, further comprising a receiving unit configured to receive, from the user through the screen displayed by the displaying unit, the instruction not to stop conveyance of the document by the conveying unit, even in the case where the detecting unit detects multi-feed of the document,
wherein, in a case where the receiving unit has received the instruction, the stopping unit does not stop the conveyance of the document by the conveying unit, even in the case where the detecting unit detects multi-feed of the document, and
wherein, in a case where the receiving unit has not received the instruction, the stopping unit stops the conveyance of the document by the conveying unit in the case where the detecting unit detects multi-feed of the document.

3. The document reading apparatus according to claim 2,
wherein, in a case where the receiving unit has not received the instruction but has received a particular instruction different from the instruction, the stopping unit does not stop conveyance of a first document by the conveying unit, even in a case where the detecting unit detects multi-feed of the first document, and
wherein, in a case where a second document is conveyed by the conveying unit after conveying the first document, the stopping unit stops the conveyance of the second document by the conveying unit in the case where the detecting unit detects multi-feed of the second document.

4. The document reading apparatus according to claim 2, further comprising an executing unit configured to execute a job for causing the reading unit to read an image of the document conveyed by the conveying unit,
wherein, in a case where the setting made by the setting unit indicates that, in response to the detecting unit detecting multi-feed of the document, the conveyance of the document by the conveying unit is to stop and where the receiving unit has received the instruction, the stopping unit does not stop the conveyance of the document by the conveying unit until the execution of the job by the executing unit is completed, even in the case where the detecting unit detects multi-feed of the document, and
wherein, in a case where the setting made by the setting unit indicates that, in response to the detecting unit detecting multi-feed of the document, the conveyance of the document by the conveying unit is to stop and where the detecting unit detects multi-feed of a document conveyed in another job to be executed by the executing unit after executing the job, the stopping unit stops the conveyance of the document conveyed in the another job by the conveying unit.

5. The document reading apparatus according to claim 2, further comprising an obtaining unit configured to obtain a number of times the detecting unit detects multi-feed of a document,
wherein, in a case where the receiving unit has not received the instruction and the number of times obtained by the obtaining unit has reached a predetermined number, the stopping unit does not stop the conveyance of the document by the conveying unit, even in the case where the detecting unit detects multi-feed of the document.

6. The document reading apparatus according to claim 1, further comprising a receiving unit configured to receive, from the user through the screen displayed by the displaying unit, an instruction to stop conveyance of the document by the conveying unit in the case where the detecting unit detects multi-feed of the document,
wherein, in a case where the receiving unit has received the instruction, the stopping unit stops conveyance of the document by the conveying unit based on the detecting unit detecting multi-feed of the document, and
wherein, in a case where the receiving unit has not received the instruction, the stopping unit does not stop the conveyance of the document by the conveying unit, even in the case where the detecting unit detects multi-feed of the document.

7. The document reading apparatus according to claim 6, wherein, in a case where the receiving unit has not received the instruction but has received a particular instruction different from the instruction, the stopping unit does not stop conveyance of a first document by the conveying unit, even in a case where the detecting unit detects multi-feed of the first document, and
wherein, in a case where a second document is conveyed by the conveying unit after conveying the first document, the stopping unit stops the conveyance of the second document by the conveying unit in the case where the detecting unit detects multi-feed of the second document.

8. A document reading apparatus comprising:
a conveying unit configured to convey a document;
a reading unit configured to read an image of the document conveyed by the conveying unit;
a detecting unit configured to detect multi-feed of the document conveyed by the conveying unit;
a setting unit configured to make a setting indicating whether, based on the detecting unit detecting multi-feed of the document, conveyance of the document by the conveying unit is to stop;
a notification unit configured to prompt a user,
wherein, in a case where the setting made by the setting unit indicates that, in response to the detecting unit detecting multi-feed of the document, the conveyance of the document by the conveying unit is to stop, the notification unit prompts the user to give an instruction not to stop conveyance of the document by the conveying unit, even in a case where the detecting unit detects multi-feed of the document.

9. A control method in a document reading apparatus having a conveying unit configured to convey a document, a reading unit configured to read an image of the document conveyed by the conveying unit, and a detecting unit configured to detect multi-feed of the document conveyed by the conveying unit, the control method comprising:
making a setting indicating whether, based on the detecting unit detecting multi-feed of the document, conveyance of the document by the conveying unit is to stop;
stopping conveyance of the document by the conveying unit in a case where the made setting indicates that, in response to the detecting unit detecting multi-feed of the document, the conveyance of the document by the conveying unit is to stop; and
displaying a screen,
wherein, in a case where the made setting indicates that, in response to the detecting unit detecting multi-feed of the document, the conveyance of the document by the conveying unit is to stop, displaying includes displaying a screen for receiving, from a user, an instruction not to stop conveyance of the document by the conveying unit, even in a case where the detecting unit detects multi-feed of the document.

10. The control method according to claim 9, further comprising receiving, via a receiving unit from the user through the displayed screen, the instruction not to stop conveyance of the document by the conveying unit, even in the case where the detecting unit detects multi-feed of the document,
wherein, in a case where the receiving unit has received the instruction, stopping includes not stopping the conveyance of the document by the conveying unit, even in the case where the detecting unit detects multi-feed of the document, and
wherein, in a case where the receiving unit has not received the instruction, stopping includes stopping the conveyance of the document by the conveying unit in the case where the detecting unit detects multi-feed of the document.

11. The control method according to claim 10,
wherein, in a case where the receiving unit has not received the instruction but has received a particular instruction different from the instruction, stopping includes not stopping conveyance of a first document by the conveying unit, even in a case where the detecting unit detects multi-feed of the first document, and
wherein, in a case where a second document is conveyed by the conveying unit after conveying the first document, stopping includes stopping the conveyance of the second document by the conveying unit in the case where the detecting unit detects multi-feed of the second document.

12. The control method according to claim 10, further comprising obtaining a number of times the detecting unit detects multi-feed of a document,
wherein, in a case where the receiving unit has not received the instruction and the obtained number of times obtained has reached a predetermined number, stopping includes not stopping the conveyance of the document by the conveying unit, even in the case where the detecting unit detects multi-feed of the document.

13. The control method according to claim 9, further comprising a receiving unit configured to receive, from the user through the displayed screen, an instruction to stop conveyance of the document by the conveying unit in the case where the detecting unit detects multi-feed of the document,
wherein, in a case where the receiving unit has received the instruction, stopping includes stopping conveyance of the document by the conveying unit based on the detecting unit detecting multi-feed of the document, and wherein, in a case where the receiving unit has not received the instruction, stopping includes not stopping the conveyance of the document by the conveying unit, even in the case where the detecting unit detects multi-feed of the document.

14. The control method according to claim 13, wherein, in a case where the receiving unit has not received the instruction but has received a particular instruction different from the instruction, stopping includes not stopping conveyance of a first document by the conveying unit, even in a case where the detecting unit detects multi-feed of the first document, and wherein, in a case where a second document is conveyed by the conveying unit after conveying the first document, stopping includes stopping the conveyance of the second document by the conveying unit in the case where the detecting unit detects multi-feed of the second document.

15. A non-transitory computer readable storage medium storing a program to cause a document reading apparatus to perform a control method, wherein the document reading apparatus includes a conveying unit configured to convey a document, a reading unit configured to read an image of the document conveyed by the conveying unit, and a detecting unit configured to detect multi-feed of the document conveyed by the conveying unit, the control method comprising:

making a setting indicating whether, based on the detecting unit detecting multi-feed of the document, conveyance of the document by the conveying unit is to stop;

stopping conveyance of the document by the conveying unit in a case where the made setting indicates that, in response to the detecting unit detecting multi-feed of the document, the conveyance of the document by the conveying unit is to stop; and displaying a screen, wherein, in a case where the made setting indicates that, in response to the detecting unit detecting multi-feed of the document, the conveyance of the document by the conveying unit is to stop, displaying includes displaying a screen for receiving, from a user, an instruction not to stop conveyance of the document by the conveying unit, even in a case where the detecting unit detects multi-feed of the document.

16. The non-transitory computer readable storage medium according to claim 15, the control method further comprising receiving, via a receiving unit from the user through the displayed screen, the instruction not to stop conveyance of the document by the conveying unit, even in the case where the detecting unit detects multi-feed of the document, wherein, in a case where the receiving unit has received the instruction, stopping includes not stopping the conveyance of the document by the conveying unit, even in the case where the detecting unit detects multi-feed of the document, and wherein, in a case where the receiving unit has not received the instruction, stopping includes stopping the conveyance of the document by the conveying unit in the case where the detecting unit detects multi-feed of the document.

17. The non-transitory computer readable storage medium according to claim 16, wherein, in a case where the receiving unit has not received the instruction but has received a particular instruction different from the instruction, stopping includes not stopping conveyance of a first document by the conveying unit, even in a case where the detecting unit detects multi-feed of the first document, and wherein, in a case where a second document is conveyed by the conveying unit after conveying the first document, stopping includes stopping the conveyance of the second document by the conveying unit in the case where the detecting unit detects multi-feed of the second document.

18. The non-transitory computer readable storage medium according to claim 16, the control method further comprising obtaining a number of times the detecting unit detects multi-feed of a document, wherein, in a case where the receiving unit has not received the instruction and the obtained number of times obtained has reached a predetermined number, stopping includes not stopping the conveyance of the document by the conveying unit, even in the case where the detecting unit detects multi-feed of the document.

19. The non-transitory computer readable storage medium according to claim 15, the control further comprising a receiving unit configured to receive, from the user through the displayed screen, an instruction to stop conveyance of the document by the conveying unit in the case where the detecting unit detects multi-feed of the document, wherein, in a case where the receiving unit has received the instruction, stopping includes stopping conveyance of the document by the conveying unit based on the detecting unit detecting multi-feed of the document, and wherein, in a case where the receiving unit has not received the instruction, stopping includes not stopping the conveyance of the document by the conveying unit, even in the case where the detecting unit detects multi-feed of the document.

20. The non-transitory computer readable storage medium according to claim 19, wherein, in a case where the receiving unit has not received the instruction but has received a particular instruction different from the instruction, stopping includes not stopping conveyance of a first document by the conveying unit, even in a case where the detecting unit detects multi-feed of the first document, and wherein, in a case where a second document is conveyed by the conveying unit after conveying the first document, stopping includes stopping the conveyance of the second document by the conveying unit in the case where the detecting unit detects multi-feed of the second document.

* * * * *